United States Patent Office 3,157,683
Patented Nov. 17, 1964

3,157,683
β-N-NITRO-N-TRINITROALKYL ISOCYANATES AND DERIVATIVES THEREOF
Henry Feuer, West Lafayette, Ind., and William A. Swarts, Niagara Falls, N.Y., assignors to Purdue Research Foundation, Lafayette, Ind., a corporation of Indiana
No Drawing. Filed Nov. 26, 1958, Ser. No. 777,812
7 Claims. (Cl. 260—453)

Our invention relates to novel nitro compounds and more particularly it relates to N-nitro-N-trinitroalkylamino isocyanates, urethane derivatives thereof and to a process for producing same.

Our new compounds are represented by the following structural formula:

$$R^1-\underset{H}{\overset{R}{\underset{|}{C}}}-R^2$$

where R is the radical $$-N(NO_2)-R^1-C(NO_2)_3$$

$R^1$ is a radical selected from the group consisting of

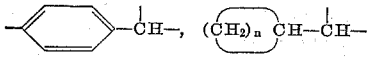

and alkylene having up to six carbon atoms; $R^2$ is the radical $-(CH_2)_{n1}-R^3$; $R^3$ is a radical selected from the group consisting of $-NCO$, and $-NH-COOR^4$; $R^4$ is alkyl having up to five carbon atoms; and $R^5$ is selected from the group consisting of hydrogen, alkyl having up to ten carbon atoms, R substituted alkyl having up to ten carbon atoms and $R^3$ substituted alkyl having up to ten carbon atoms, $n$ is an integer between 3 and 9 and $n_1$ is an integer between one and ten.

Compounds within the scope of the above structural formula include: 2-[N-nitro-N-(2,2,2-trinitroethyl)amino]-1,3-propane diisocyanate, 2-[N-nitro-N-(2,2,2-trinitroethyl)amino]-1,4-butane diisocyanate, 2-[N-nitro-N-(2,2,2-trinitroethyl)amino] ethane isocyanate, diethyl urethane of 2-[N-nitro-N-(2,2,2-trinitroethyl)amino]1,3-propane diisocyanate, dibutyl urethane of 2-[N-nitro-N-(2,2,2-trinitroethyl)amino]-1,4-butane diisocyanate, ethyl urethane of 2-[N-nitro-N-(2,2,2-trinitroethyl)amino]-ethyl isocyanate, 2-[N-nitro-N-(1-trinitromethylpropyl)amino]-1,3-pentane diisocyanate, 2-[N-nitro-N-(2,2,2-trinitro-1-phenylethyl)amino]-1,8-octanediisocyanate, 3-[N - nitro-N-(1-p-nitrophenyl-2,2,2-trinitroethyl) amino]-1,5-pentane diisocyanate, 4-[N-nitro-N-(1-trinitromethyl-pentyl)amino]-1,8-octanediisocyanate, 3-[N-nitro-N-(1-cyclopentyl - 2,2,2 - trinitroethyl)amino]-1,5-pentanediisocyanate, 2 - [N-nitro-N(1-cyclooctyl-2,2,2-trinitroethyl)amino]-ethyl isocyanate, 2,5-bis[N-nitro-N-(2,2,2-trinitroethyl)amino]-1-pentane isocyanate, 2,9-bis[N-nitro-N-(1-trinitromethylpentyl)amino]1-nonane isocyanate, 2-[N-nitro-N-(2,2,2-trinitroethyl)amino]1,5-pentane diisocyanate, 3 - [N-nitro-N-(2,2,2,trinitroethyl)amino]1,5-pentane diisocyanate, 2-[N-nitro-N-(2,2,2-trinitroethyl)amino]1,8-octane diisocyanate, 2,9-bis[N-nitro-N-(1-m-chlorophenyl - 2,2,2-trinitroethyl)amino]1,10-decane diisocyanate, dipropyl urethane of 3-[N-nitro-N-(2,2,2-trinitroethyl)amino]amino-1,5-pentane diisocyanate, diethyl urethane of 2-[N-nitro-N-(2,2,2-trinitroethyl)amino]-1,9-nonane diisocyanate.

In producing our new isocyanates and urethane derivatives thereof, we employ the so-called Curtius reaction. An extensive discussion of this reaction can be found in Organic Reactions, vol. 3, page 337, John Wiley & Sons, Inc., New York (1946). According to the Curtius reaction, β-N-nitro-N-trinitroalkylamino isocyanates are prepared by reacting the corresponding acid chloride with sodium azide after which the resulting reaction product is refluxed in the presence of an inert solvent to produce the isocyanate. In preparing the urethane derivative, the inert solvent solution of the reaction product of the corresponding acid chloride and sodium azide is refluxed in the presence of an excess of an alkyl or aryl alcohol, such as methanol, ethanol, phenol, pentanol, naphthyl alcohol, octanol, etc.; and nitroalcohols, such as nitroethanol, 2-nitro-1-propanol, 3-nitro-1-pentanol, trinitroethanol, etc.

As indicated above, the isocyanate products are obtained by first reacting a N-nitro-N-trinitroalkylamino acid chloride with sodium azide. The acid chloride starting material can be obtained by the method described in co-pending application Serial No. 593,009. Suitable acid chlorides include β-(N-nitro-N-trinitroethyl-amino) glutaryl chloride, β-(N-nitro-N-trinitroethylamino)-adipyl chloride, N-nitro-N-trinitroethyl-β-alanyl chloride, etc. The reaction is generally carried out at low temperatures in the presence of a non-aqueous medium, preferably acetic acid. Other nonaqueous media which can be employed include aromatic hydrocarbons, such as benzene, toluene, ethylbenzene, xylene, etc.; ethers, such as diethyl ether, dipropyl ether, amyl ether, etc.; chlorinated compounds, such as dichloroethylene; carbon tetrachloride, chlorobenzene, etc. The reaction product is then preferably diluted with an inert solvent, washed with water and dried with magnesium sulfate after which the inert solvent solution is refluxed to produce the desired isocyanate product. Suitable inert solvents include ethers, chloroform, benzene and its homologues, etc.; paraffins, such as pentane, hexane, octane, etc.; cyclic paraffins, such as cyclopentane, cyclohexane, etc.; ethers, such as diethyl ether, dipropyl ether, tetrahydrofuran, tetrahydropyran, dioxan, etc.; aromatic hydrocarbons, such as benzene, toluene, xylene, etc.; chlorinated compounds, such as dichloroethylene, carbon tetrachloride, chlorobenzene, etc. If the urethane derivative is desired, the reaction product resulting from the reaction of the acid chloride with sodium azide is refluxed in the presence of an inert solvent such as those mentioned above and also in the presence of an alcohol suitable for production of the desired urethane derivative. Suitable alcohols which can be employed include ethanol, methanol, etc.

The isocyanate derivative can generally be recovered from the solvent solution in which it is obtained by distillation in vacuo to remove the solvent, the residue being the desired isocyanate. The urethane derivative can generally be recovered by concentration of the solvent solution containing the urethane product after which the urethane derivative can be precipitated by addition of a suitable precipitating agent such as hexane, petroleum ether, etc. The urethane derivative can generally be recrystallized from any suitable solvent such as, for example, ethylene dichloride.

Rubber-like materials can be prepared by interaction of our diisocyanates with anhydrous polyester cross-linking agents, such as polyesters prepared from glycols, such as ethylene glycol, 1,3-butylene glycol, 1,6-hexanediol, 2,2-dinitro-1,3-propanediol, etc., and dibasic acids such as succinic acid diglycolic acid, phthalic acid, etc.

Other polymers having desired properties can be formed by interacting our diisocyanates with any compound containing an active hydrogen, i.e., one which can be replaced by sodium. Among these active hydrogen containing compounds are included alkyl amines, ammonia, aryl amines, active methylene groups, amides, etc.

Our compounds can be used to form polymers useful as both solid and liquid propellants for reaction motors. These polymers can be fluids or solids, depending on the chain length of the polymers, the nature of the cross-linking agent, etc. These polymers are also stable to shock, heat, etc., to the extent that, as a general rule, additional stabilizers are not required in the propellant mixtures. Our monomers are plasticizers for nitropolymers formed from the said monomers.

As previously indicated, low molecular weight polymers prepared from the monomers of our invention are fluids. These propellants are generally rich in fuel elements and as such can be utilized as a fuel in the process of U.S. Patent No. 2,537,526 where tetranitromethane and hexanitroethane were used as oxidants and liquid nitroparaffins were used as fuels; in the processes described in U.S. Patent No. 2,582,048 and No. 2,548,803 wherein nitro-substituted aliphatic compounds having more than one nitro group per carbon atom were used as oxidants and nitrosubstituted compounds having less than one nitro group per carbon atom were used as fuels in monopropellant systems; or in the similar process of U.S. Patent No. 2,590,009.

We have found that generally our solid polymers can be dissolved in polar solvents, such as dimethylformamide and lower nitroalkanes, such as tetranitromethane, and, as such, are operative as fuels in the above-described processes. Other solvents which can be used to liquify our polymers include dimethylsulfoxide, Cellosolve, acetonitrile, lower alkanols, nitroesters and nitroethers.

Our polymers can be mixed with various oxidant salts, such as ammonium nitrate, ammonium perchlorate, lithium perchlorate, etc. to obtain solid heterogeneous propellants having specific impulses on the order of that of Ballistite.

The following examples are offered to illustrate our invention. However, we do not intend to be limited to the specific materials, procedures, or proportions shown. Rather we intend to include within the scope of our invention all equivalents obvious to those skilled in the art.

*Example I*

A solution of 0.4 gram of β-(N-nitro-N-trinitroethylamino)glutaryl chloride in 10 ml. of acetic acid was cooled to 15° with stirring and approximately 0.35 gram of sodium azide added and the resulting slurry stirred at 15° for 30 minutes. The slurry was then diluted with 50 ml. of chloroform, the solution washed with eight 50 ml. portions of distilled water and then dried with magnesium sulfate. The chloroform solution was then heated under reflux for about 30 minutes and the solvent removed in vacuo to obtain 2-(N-nitro-N-trinitroethylamino)-1,3-propane diisocyanate as a yellow solid material. *Analysis.*—Calculated: N=28.1%. Found: N=27.2%.

*Example II*

A chloroform solution of the reaction product between β-(N-nitro-N-trinitroethylamino)glutaryl chloride and sodium azide obtained as shown in Example I was refluxed in the presence of an excess of pure dry ethanol for about 30 minutes. The solution was then concentrated to about 7 ml. and poured into 50 ml. of hexane. The solid that precipitated was recrystallized from ethylene dichloride to yield the diethyl urethane of 2-(N-nitro-N-trinitroethylamino)-1,3-propane diisocyanate. *Analysis.*—Calculated: N=22.2%. Found: N=22.1%.

*Example III*

A solution of 0.25 gram of N-nitro-N-trinitroethyl-β-alanyl chloride in 5 ml. of glacial acetic acid was cooled to 15°. To this solution, 0.5 gram of sodium azide was added and the resultant slurry stirred at 15° for 90 minutes after which the slurry was diluted with 30 ml. of chloroform, washed with eight 25 ml. portions of distilled water and dried over magnesium sulfate. The dry chloroform solution was then refluxed for about three hours after which the chloroform was removed in vacuo to give an oily product that was taken up in 5 ml. of toluene. A total of 100 ml. of hexane was added to precipitate 2-(N-nitro-N-trinitroethylamino)-ethyl isocyanate. *Analysis.*—Calculated: N=28.6%. Found: N=28.6%.

*Example IV*

A chloroform solution of the reaction product of N-nitro-N-trinitroethyl-β-alanyl chloride and sodium azide obtained as shown in Example III was refluxed in the presence of excess ethanol after which the solution was concentrated in vacuo to about 5 ml. and poured into about 50 ml. of hexane. The oil that precipitated became solid after cooling in the refrigerator after which the solid was reprecipitated from ethylene dichloride to give the ethyl urethane of 2-(N-nitro-N-trinitroethylamino)-ethyl isocyanate as golden yellow crystals. *Analysis.*—Calculated: N=24.7%. Found: N=25.0%.

As indicated above, our new compounds can be polymerized to obtain polymers useful as rocket propellants and explosives. The following examples are offered to illustrate the production of polymers.

*Example V*

Equimolar amounts of 2-methyl-2-(N-nitro-N-trinitroethylamino)-1,3-propanediol and 2-(N-nitro-N-trinitroethylamino)1,3-propane diisocyanate in a ratio of 1:1 were dissolved in ethylene chloride and the resulting mixture heated at 50° C. for about 24 hours. The resulting solution was then poured into ice water and the precipitated polymer was washed with water and dried in vacuo. The resulting polymer has a calculated specific impulse of 225.

*Example VI*

Equimolar amounts of polyvinyl alcohol and 2-(N-nitro-N-trinitroethylamino)-ethyl isocyanate were heated in the presence of boron trifluoride in dioxane for 48 hours. After this time, the solution was poured slowly into the water and the precipitated polymer was dried.

*Example VII*

Equimolar quantities of 2-(N-nitro-N-trinitroethylamino)ethanol and 2-(N-nitro-N-trinitroethylamino)-ethyl isocyanate were heated in dioxane in the presence of boron trifluoride etherate for about six hours. After this time the solvent was distilled off in vacuo and the resulting precipitate recrystallized from dioxane. It was found to be suitable for use as an explosive.

This application is a continuation-in-part of our U.S. Patent Application Serial No. 645,871, filed March 13, 1957.

Now having described our invention what we claim is:
1. The composition having the following structural formula:

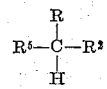

where R is the radical

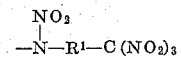

$R^1$ is a radical selected from the group consisting of

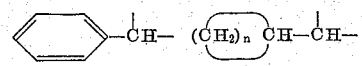

and alkylene having up to six carbon atoms; $R^2$ is the radical $-(CH_2)_{n_1}-R^3$; $R^3$ is a radical selected from the group consisting of $-NCO$, and $-NH-COOR^4$; $R^4$ is alkyl having up to five carbon atoms; and $R^5$ is selected from the group consisting of hydrogen, alkyl having up to ten carbon atoms, R substituted alkyl having up to ten carbon atoms and $R^3$ substituted alkyl having up to ten carbon atoms, $n$ is an integer between 3 and 9 and $n_1$ is an integer between one and ten.

2. 2-(N-nitro-N-trinitroethylamino)-1,3-propane diisocyanate.

3. 2-(N-nitro-N-trinitroethylamino)-1,4-butane diisocyanate.

4. 2-(N-nitro-N-trinitroethylamino)ethyl isocyanate.

5. The diethyl urethane of 2-(N-nitro-N-trinitroethylamino-1,3-propane diisocyanate.

6. The ethyl urethane of 2-(N-nitro-N-trinitroethylamino)ethyl isocyanate.

7. The composition having the general formula:

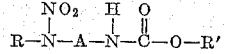

wherein R is a lower trinitroalkyl radical in which the nitro groups are all on the terminal carbon atom; R' is a lower alkyl radical; and A is a lower alkylene radical.

No references cited.